No. 753,983. PATENTED MAR. 8, 1904.
J. R. JONES.
CULTIVATOR.
APPLICATION FILED MAR. 7, 1901. RENEWED MAR. 24, 1903.
NO MODEL. 3 SHEETS—SHEET 1.
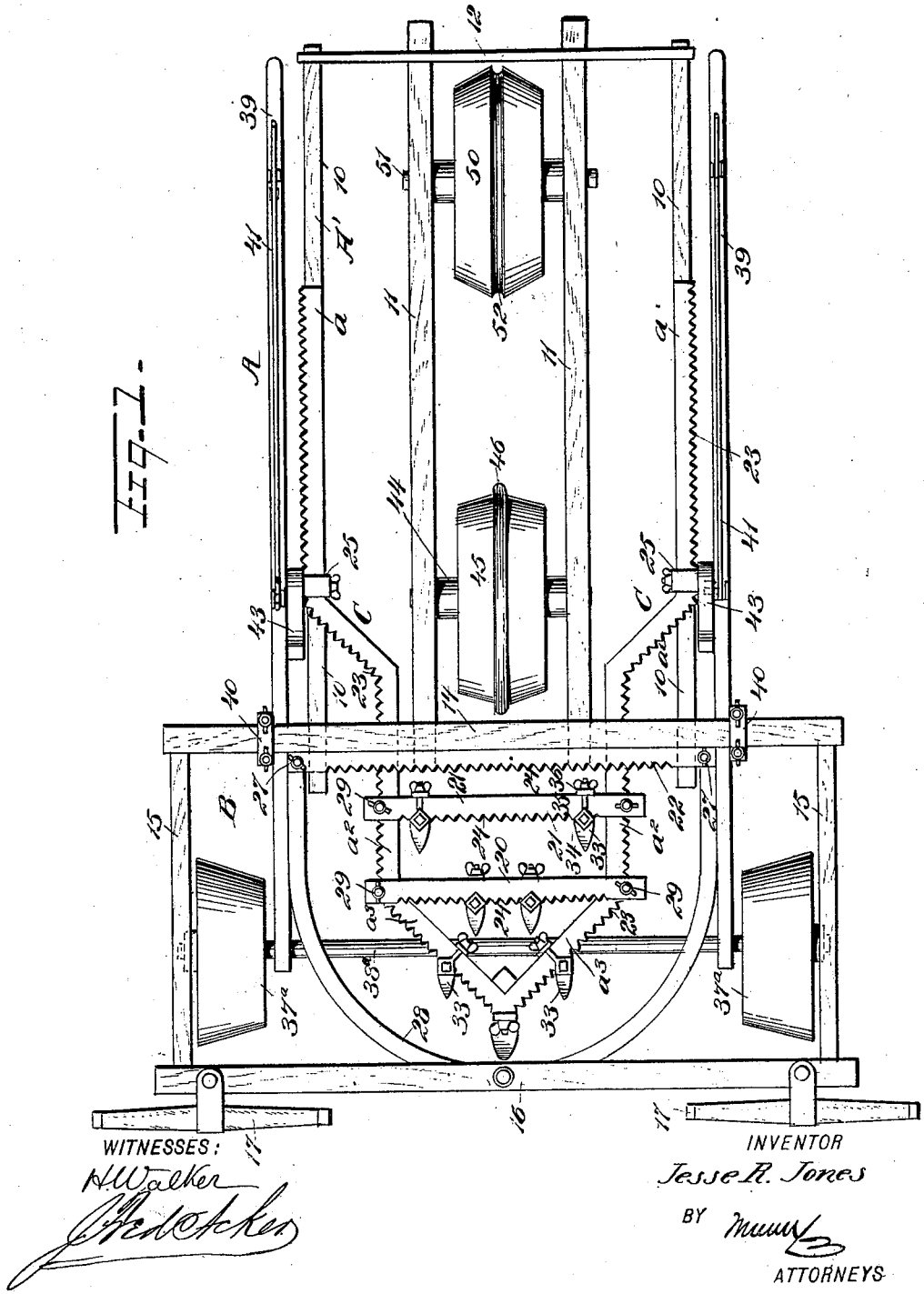
WITNESSES:
H. Walker
INVENTOR
Jesse R. Jones
BY
ATTORNEYS

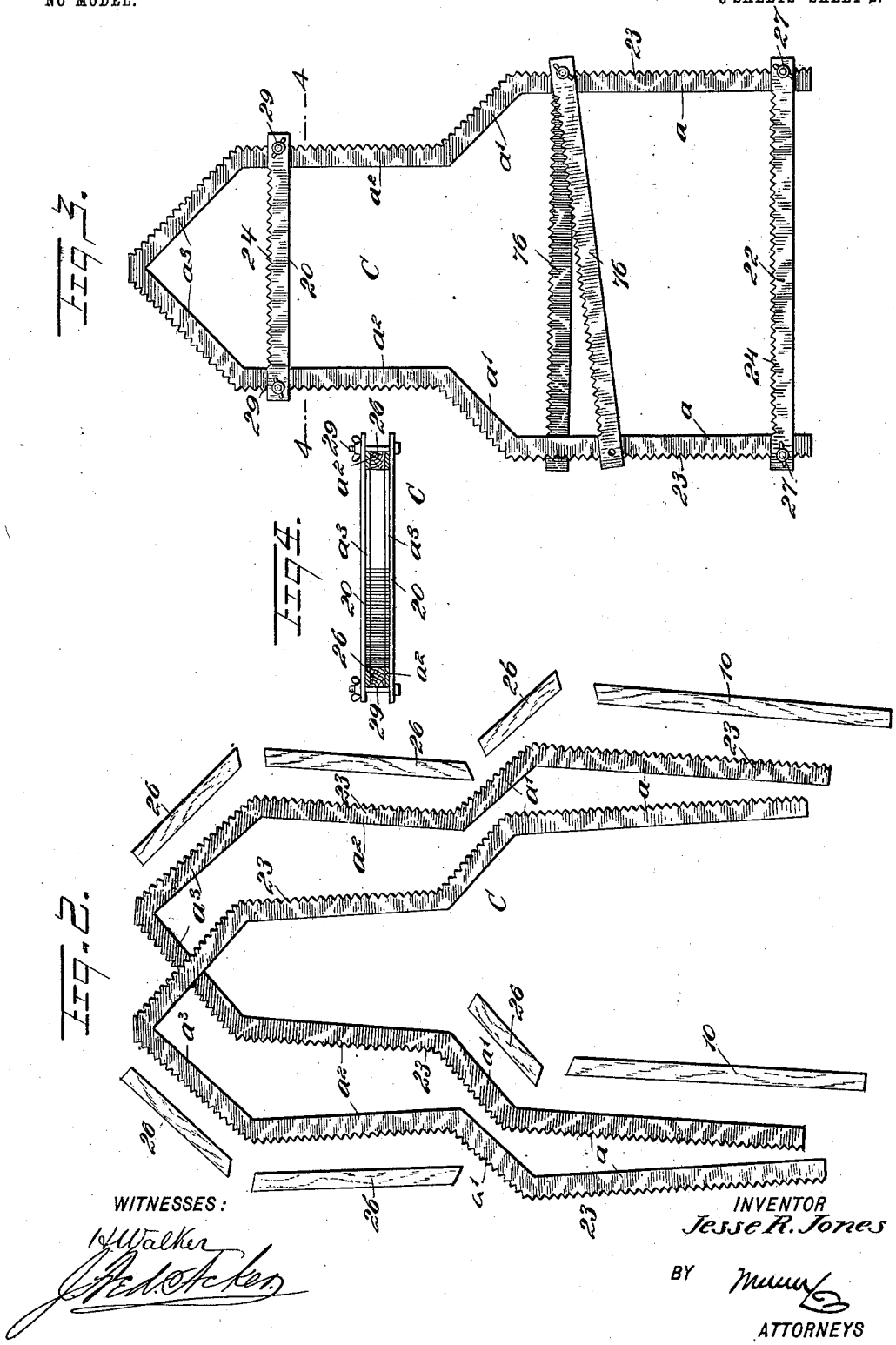

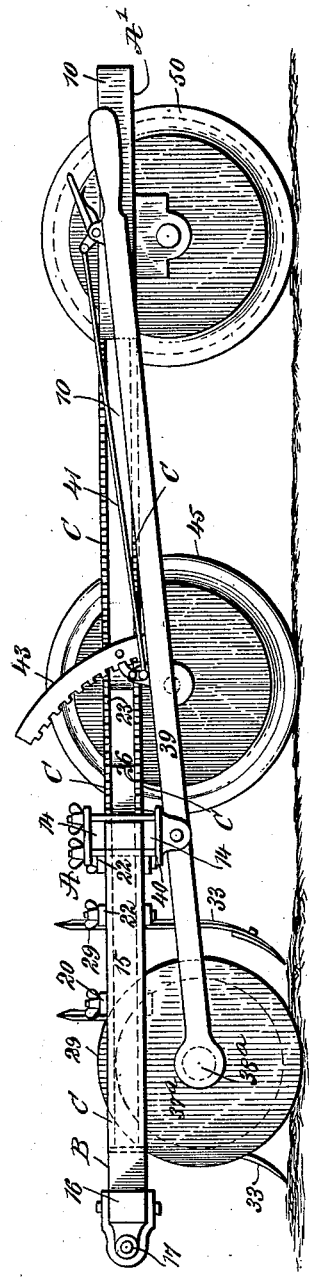

No. 753,983. Patented March 8, 1904.

UNITED STATES PATENT OFFICE.

JESSE RUBLE JONES, OF JACKSON, MISSISSIPPI.

CULTIVATOR.

SPECIFICATION forming part of Letters Patent No. 753,983, dated March 8, 1904.

Application filed March 7, 1901. Renewed March 24, 1903. Serial No. 149,397. (No model.)

*To all whom it may concern:*

Be it known that I, JESSE RUBLE JONES, a citizen of the United States, and a resident of Jackson, in the county of Hinds and State of Mississippi, have invented a new and useful Improvement in Frames for Cultivators, of which the following is a full, clear, and exact description.

My invention relates to improvements upon that class of agricultural implements in which the main frame is adapted not only to support seedboxes of seed-distributing mechanism, but also, more particularly, cultivator-teeth or shovels.

The purpose of the invention is to so construct a portion of the frame of the implement that cultivator-teeth or the shanks of shovels or shares may be readily attached to said frame and be given any desired adjustment vertically or laterally or be given any desired inclination, which frame has its members serrated and comprises, primarily, longitudinal upper and lower bars and upper and lower cross-bars, said cross-bars being movable relatively to each other to vary the relative positions of the serrations of the bars.

The invention consists in the novel construction and combination of the several parts, as will be hereinafter fully set forth, and pointed out in the claims.

Reference is to be had to the accompanying drawings, forming a part of this specification, in which similar characters of reference indicate corresponding parts in all the figures.

Figure 1 is a plan view of the improved frames and accessories thereto. Fig. 2 is a plan view of a frame adapted to receive cultivator-teeth and the like, removed from the wheel-supported frame and having its members shown separated. Fig. 3 is a plan view of a frame similar to that shown in Fig. 2, the majority of its parts being in proper position; and Fig. 4 is a transverse section taken substantially on the line 4 4 of Fig. 3. Fig. 5 is a side elevation of the improved frame and its support.

In Fig. 1 I have illustrated a wheel-supported frame A, associated with an improved tooth-supporting frame C. The wheel-supported frame comprises a rear section A' and a front section B. The rear section A' of the frame A comprises two parallel side beams or bars 10, two intermediate longitudinal beams 11, and a rear tie-bar 12. The intermediate beams 11 preferably extend out beyond the tie bar or beam 12, and a forwardly-arched beam or bar 28 is attached to the said beam 10. The front section B of the main frame comprises two transverse beams 14, which extend one above the other below the forward end portions of the beams 10 of the rear frame-section A', together with side bars 15, connected with the arched beam or bar in any approved manner, and the draft-tree 16 is attached to the arched bar 28 when the implement is drawn by a team. The tooth or shank supporting frame C is of peculiar construction and is described as follows: Said frame C comprises an upper and a lower section, which sections are adapted to be placed one above the other a given distance. These sections are of like formation, as is shown in Figs. 2 and 3. The forward portion of the tooth or shank supporting frame is much narrower than is the rear portion, and the forward extremity of the frame C is inclined from the center rearward, so that the front portion thereof is more or less triangular. Each section of the tooth or shank supporting frame C is preferably made of steel or iron and comprises rear straight members $a$, front side members $a^2$, connecting members $a'$, which unite the rear side members with the forward side members, and front members $a^3$, which are connected at their forward ends and incline rearward in opposite directions, connecting with the forward ends of the front side members $a^2$. One section of the tooth-supporting frame is placed above the wheel-supported frame and the other section at the point just below it, and the rear members $a$ of the two sections receive between them the side bars 10 of the rear portion A' of the wheel-supported frame of the machine. In connection with each section of the tooth or shank supporting frame C transverse bars 20, 21, and 22 are employed, and in the outer edge of each section of the tooth-supporting frame a series of teeth, notches, or serrations 23 is produced, the teeth or notches in the two sections being in vertical alinement, and the cross-bars 20, 21, and 22, as are shown, have similar teeth, notches, or serrations 24 made in their forward edges. In Fig. 1 the cross-bars 20 and 21 are represented as extending across the forward side members $a^2$ of the sections and beyond the toothed edges of said sections, while the cross-bars 22, which are longer than the others, extend above and below the forward ends of the side beams 10 and the forward ends of the intermediate beams 11 of the rear portion A' of the wheel-supported frame. The space between the sections of the tooth-supporting frame at the members $a'$, $a^2$, and $a^3$ is filled by suitable plugs 26, (shown best in Fig. 2,) and the members of the cross-bars 22 are connected with the end portions of the arched beam or bar 28 by bolts 27, provided with wing-nuts, or in any equivalent manner, as is shown in Fig. 1. The bolts 27 are placed adjacent to the plugs 26, since the plugs are omitted between the members of the said cross-bar 22. Similar bolts 29 are passed through the outer ends of the members of the shorter cross-bars 20 and 21. The rear portion of the tooth-supporting frame C is secured to the wheel-supported frame A by clips 25 or like devices.

I desire it to be understood that the cross-bars of the tooth-supporting frame C may be placed in any desired position on the body of the frame and may be of any suitable length. Thus, as shown in Fig. 3, a single cross-bar may be located at the forward narrower portion of the frame, while two cross-bars 76 may be located at the wider and rear portion of the frame.

In Fig. 1 I show the shanks of cultivator-teeth 33, secured in certain of the notches or serrations of the frame C by means of suitable adjustable clips, and in the same figure the forward portion of the frame A is adjustably supported by wheels $37^a$ in the shape of the frustum of a cone, the wheels being mounted upon the axle $38^a$. The axle $38^a$ is mounted in the forward ends of arms 39, fulcrumed upon hangers 40, secured to the intermediate cross-bar 14. The arms 39 extend to the rear portion of the frame A, and each is provided with a latch-lever 41, adapted to engage with the teeth of a rack 43, carried by the side beams 10 of the frame A. The frame A is further supported near its center by a furrow-opening wheel 45 and at its rear by a furrow-closing wheel 50, the axles of both wheels 45 and 50 being journaled in suitable bearings carried by the intermediate beams 11 of the frame A.

It will be observed that the top and bottom bars of the frame C are adjustable relatively to each other and that the cross-bars are movable relatively to each other to vary the relative positions of the serrations of the bars, and thus admit of teeth or shanks carried by the frame being given any desired adjustment vertically or horizontally or given any required inclination. The peculiar form of the frame C enables the cultivator-teeth to be most advantageously distributed, and a greater number are successfully brought into action than in the simple zigzag form of frame.

Having thus described my invention, I claim as new and desire to secure by Letters Patent—

1. A frame for cultivators, comprising serrated longitudinal upper and lower bars, and serrated upper and lower cross-bars, the said longitudinal bars being adjustable relatively to each other and said cross-bars being movable relatively to each other to vary the relative positions of the serrations of the bars.

2. A frame for cultivators, comprising separate serrated top and bottom bars adjustable relatively to each other, for the purpose described.

3. A frame for cultivators, consisting of upper and lower separate sections adjustable relatively to each other, one section being a duplicate of the other and each section consisting of serrated side bars and connected serrated front bars at angles to each other, the front bars being connected with the side bars, as set forth.

4. A frame for cultivators, comprising upper and lower separate longitudinal sections adjustable relatively to each other, serrated cross-bars movable upon the longitudinal sections relatively to each other, and means for securing the cross-bars to the longitudinal sections of the frame, one longitudinal section being a duplicate of the other, and each section consisting of serrated side bars and serrated front bars at angles to each other, connecting the side bars, as specified.

5. In combination with a supporting-frame, adjustable implement-carrying frame-sections on the upper and lower sides thereof having notches to receive implement-shanks, substantially as described.

6. In an agricultural implement, the combination of a frame comprising upper and lower sections having serrations, of cultivator-teeth attached to the serrations, and means for holding the teeth in place, the said upper and lower frame-sections being movable relatively to each other to vary the relative positions of the upper and lower sections.

7. A frame for cultivators and the like, having superposed slidably-related sections for the attachment of implements, said sections being adjustable longitudinally and laterally with relation to each other.

8. In combination with a relatively fixed frame implement-carrying frame-sections on the upper and lower sides thereof, adjustable with reference to each other.

9. In combination with a supporting-frame, implement-carrying frame-sections on the upper and lower sides thereof adjustable with reference to each other.

10. In combination with a supporting-frame, implement-carrying frame-sections on the upper and lower sides thereof, longitudinally adjustable with reference to each other.

11. In combination with a supporting-frame, implement-carrying frame-sections on the upper and lower sides thereof longitudinally and laterally adjustable with reference to each other.

12. In combination with a relatively fixed frame, implement-carrying frame-sections on the upper and lower sides thereof having adjustable elements.

In testimony whereof I have signed my name to this specification in the presence of two subscribing witnesses.

JESSE RUBLE JONES.

Witnesses:
   E. WATKINS,
   J. W. PERSONS.